Dec. 20, 1938.  P. L. SENTZ  2,140,856
POULTRY FEEDER
Filed July 12, 1937

INVENTOR
P. L. Sentz
BY
ATTORNEY

Patented Dec. 20, 1938

2,140,856

UNITED STATES PATENT OFFICE 2,140,856

POULTRY FEEDER

Paul L. Sentz, Colfax, Calif.

Application July 12, 1937, Serial No. 153,124

4 Claims. (Cl. 119—61)

This invention relates generally to a device for use in connection with the raising of poultry and, in particular, the invention is directed to an improved poultry feeder. Many poultry men now employ a plurality of poultry feeding devices of different sizes, the smallest size being used for the young chicks and the increasingly larger sizes used during different intervals as the stock grows toward maturity. Such practice however is not only inconvenient but requires a considerable expenditure of money.

It is therefore the principal object of my invention to provide an adjustable poultry feeder which is adapted for use to feed poultry regardless of size; the device being so arranged that with a simple adjustment of the parts any size poultry may be successfully fed.

It is also an object of my invention to provide a poultry feeder which is so constructed that it not only keeps the feed clean and sanitary but also prevents waste, resulting in the production of healthy stock and at a reasonable and economical cost.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
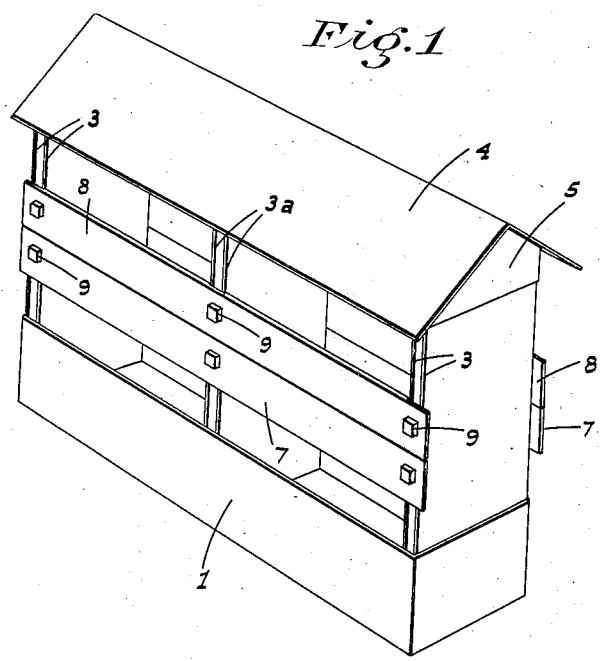
Figure 1 is a perspective view of the feeder adjusted for feeding chicks.

Referring now more particularly to the characters of reference on the drawing, the device is preferably constructed of galvanized metal and comprises a rectangular, open top feed trough 1 provided with inturned and downwardly sloping feed saving lips 2.

A pair of spaced upstanding walls 3 are fixedly mounted in the trough at each end thereof while another pair of like walls 3a are mounted in the trough centrally of its ends. The upper ends of the walls 3 and 3a terminate in a common plane and are straight across at the top, the upper edges of each pair being connected together as shown in order to maintain the walls properly spaced. A top or cover 4 having sloping sides is disposed above the walls 3 and 3a and is mounted in removable connection therewith by means of spaced plates 5. Such plates are arranged to engage over the upper ends of corresponding wall units, and blocks 6 between plates 5 limit the amount of engagement thereof with the wall units and maintain the top at the proper height above the trough.

A pair of relatively wide feed gauge slats, of substantially the same length as the trough and indicated at 7 and 8, is horizontally disposed on each side of the feeder adjacent and in engagement with the side edges of the wall units; the corresponding slats of the pairs being connected together by means of tie bolts 9 which extend between the walls of each wall unit. These slats have feed saving lips 10 turned inward and at a downward slope from the upper edge. As so mounted, corresponding slats on each side of the feeder may be raised or lowered as desired.

Figure 2:
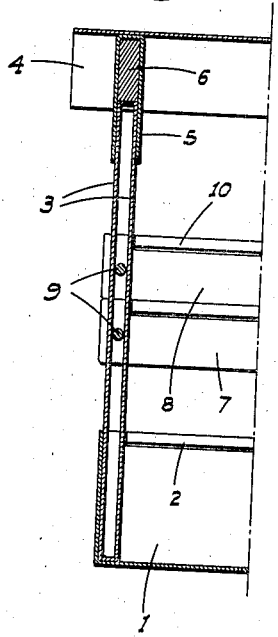
Figure 2 is an enlarged, fragmentary, longitudinal section of the feeder at one end, and in the same adjusted position as in Fig. 1.
Figure 3:
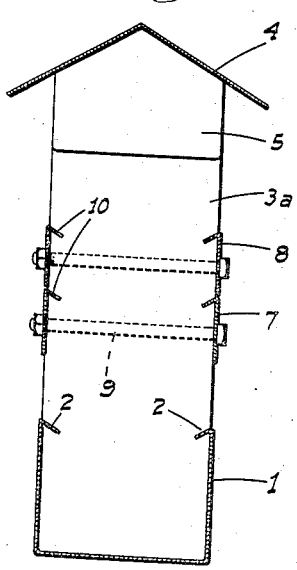
Figure 3 is a cross section of the feeder with the parts in the same position as in Fig. 1.

When used for chicks between the ages of seventy-two hours and four weeks, the slats are disposed close together and with a clearance or feeding opening of approximately one inch between the lower edge of the bottom slats and the upper edges of the trough as shown in Figs. 1 to 3 inclusive. As so adjusted, the chicks can feed with ease and yet cannot climb into the trough.

Figure 4:
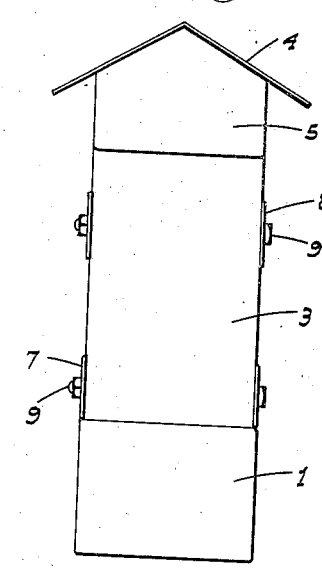
Figure 4 is a cross section of the feeder adjusted for the feeding poultry after the chick stage but before reaching adult age.

Between the ages of four and seven weeks, the lower slats are slipped down into engagement with the upper side edges of the trough, and the upper slats are moved upward slightly until the feed openings between the slats is approximately one and one-half inches, as shown in Fig. 4.

Figure 5:
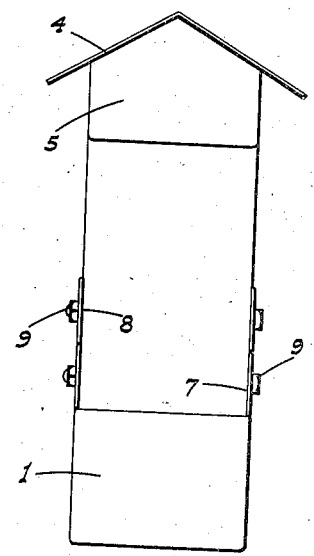
Figure 5 is a cross section of the feeder as adjusted for feeding mature poultry.

For feeding mature poultry, the slats are both lowered as shown in Fig. 5 leaving feed openings of approximately two and one-half inches between the upper slats 8 and top 4.

By reason of the described structure, the one size feeder can be used successfully to feed poultry from young chicks to maturity. The device is inexpensive to manufacture and economical in use as it prevents the undue waste of feed which occurs when the poultry can gain entry to the trough.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A poultry feeder comprising an open topped trough, a wall unit upstanding from each end of the trough, each unit comprising a pair of spaced walls, a protective cover mounted on the upper ends of the walls, a substantially horizontal slat extending lengthwise of the trough on each side and disposed against the side edges of the wall units, and a tie element extending between the walls of each unit and connecting the corresponding end portions of the slats, the slats being held in close but slidable relation to said edges of the wall units.

2. A device as in claim 1 including other slats disposed above the first named slats and other tie elements extending between the walls of the units and connecting the corresponding ends of said other slats.

3. A poultry feeder comprising an open topped trough for feed, and means forming a feed opening above the trough, said means including a pair of vertically shiftable members disposed one above the other and extending lengthwise of the trough, said members being arranged so that the upper edge of the upper member forms the lower edge of the feed opening, or the lower edge of the lower member forms the upper edge of the opening, or the lower edge of said upper member forms the upper edge of the feed opening and the upper edge of said lower member forms the lower edge of the feed opening, selectively.

4. A poultry feeder comprising an open topped trough, walls upstanding from the trough adjacent its ends, a protective cover supported by the walls and above the trough, a feed opening being formed between the cover and trough, a pair of horizontal feed gauge slats disposed in edge to edge relation and extending across the feed opening, the lowermost slat being disposed in edge to edge relation with the adjacent upper edge of the trough, and means mounting the slats in connection with the walls for vertical sliding movement; there being an inturned lip extending from the upper edge of each slat and from said adjacent upper edge of the trough.

PAUL L. SENTZ.